United States Patent
Giraud et al.

(10) Patent No.: US 8,763,138 B2
(45) Date of Patent: Jun. 24, 2014

(54) METHOD AND DEVICE FOR SECURITY LOADING A MEMORY AND AN ASSOCIATED MEMORY

(75) Inventors: Christophe Giraud, Pessac (FR);
Antoine Lemarechal, Paris (FR)

(73) Assignee: Oberthur Technologies, Colombes (FR)

( * ) Notice: Subject to any disclaimer, the term of this patent is extended or adjusted under 35 U.S.C. 154(b) by 1675 days.

(21) Appl. No.: 11/793,611

(22) PCT Filed: Dec. 19, 2005

(86) PCT No.: PCT/FR2005/003179
§ 371 (c)(1),
(2), (4) Date: Sep. 10, 2007

(87) PCT Pub. No.: WO2006/067319
PCT Pub. Date: Jun. 29, 2006

(65) Prior Publication Data
US 2008/0040812 A1    Feb. 14, 2008

(30) Foreign Application Priority Data
Dec. 20, 2004 (FR) ...................................... 04 13575

(51) Int. Cl.
*G06F 7/04*    (2006.01)

(52) U.S. Cl.
USPC .................................. 726/26; 726/27; 726/30

(58) Field of Classification Search
USPC ............................................. 726/27; 711/102
See application file for complete search history.

(56) References Cited

U.S. PATENT DOCUMENTS

2003/0101351 A1    5/2003    Liardet

OTHER PUBLICATIONS

Miremadi et al. "Evaluating processor-behavior and three error-detection mechanisms using physical fault-injection" pp. 441-445, published in 1995.*
Borst et al., "Cryptography on Smart Cards," Computer Networks, vol. 36, No. 4, pp. 423-435 (Jul. 16, 2001).

\* cited by examiner

*Primary Examiner* — Edward Zee
*Assistant Examiner* — Baotran N To
(74) *Attorney, Agent, or Firm* — Young & Thompson

(57) ABSTRACT

Method for security loading of at least one residual memory space including at least one program, in particular in a smart card, consists in carrying out successive cycles for selecting (E13, E23, E33) at least one type of data from a predetermined authorized data set, wherein said authorized data set excludes at least one type of data corresponding to a determined instruction, and in introducing (E14, E24, E34) the at least one type of data selected from the at least one residual memory space in such a way that at least one part of the residual memory space is loaded.

28 Claims, 5 Drawing Sheets

| 0x65 | 0xD2 | 0x56 | 0x89 | 0x56 | 0x16 | 0x65 | 0x56 |

| Call | processing | anomaly |

FIGURE 3

METHOD AND DEVICE FOR SECURITY LOADING A MEMORY AND AN ASSOCIATED MEMORY

FIELD OF THE INVENTION

The present invention pertains to a method for security filling a memory, in particular in a microcircuit card (also called a "chip card"), a device implementing such a method and a memory in which the method is implemented.

Subsequently in this document, memory will be understood to mean any memory, that is to say, a permanent memory, for example a ROM or EEPROM memory or a hard disk, or a volatile memory, for example of RAM type.

Additionally, "securing" of a memory will be understood to mean any processing aimed at guarding against attacks in particular by disturbing the operation of an electronic entity, also called "fault attacks".

BACKGROUD OF THE INVENTION

The present invention is aimed, in particular, at protecting a memory at one and the same time against attacks consisting in analyzing the structure of a memory, in particular in a secure electronic entity and against attacks intended to modify the running of the execution of a computer program executing on a secure electronic entity (for example, a microcircuit card, a secure PCMCIA card (for example an IBM4758 card), a USB key or a passport integrating a chip with a contactless interface in one of its pages).

Fault attacks are aimed at illicitly modifying the content or the reading of the content of a register, of a memory or of a bus, or at compelling a processor not to execute, or to poorly execute, certain instructions of a computer program. The attacked computer program may then run in a very different way from that which had been envisaged at the time of its design.

These attacks can, inter alia and in a known manner, be performed:
  by generating a voltage spike at one of the supply terminals of the processor;
  by abruptly raising its temperature;
  by rapidly changing its clock frequency or its supply voltage;
  by applying a flash of light, a laser ray, or an electromagnetic field, to a part of the silicon of which it is composed.

Such attacks are particularly active on certain instructions of a program, in particular on account of jump instructions, or the manipulation of the program counter.

According to the current state of the art, various procedures for resisting intrusions aimed at detecting the structure of a memory are available to a person skilled in the art.

A procedure for combating attacks that consist in analyzing the structure of a memory relies on filling each free byte of the memory at issue by a random number, when one wants to secure, for example, the ROM memory of a secure microcontroller.

This memory stores programs and data associated with the programs necessary for the operation of the secure microcontroller. These programs and data are, mainly, the operating system of the chip card, applications and data specific to the operation and to the behavior of the chip card.

Each microcontroller possesses a ROM memory of predetermined fixed size. After the applications, in particular the operating system and the data, have been stored in the ROM memory, one or more memory spaces remain unoccupied, that is to say are free. These residual memory spaces are more or less significant according to the size of the ROM memory and that of the programs and data stored in this memory.

The size of the ROM memory can be, for example, 64 Kbytes, and the residual memory spaces can be, for example, 1 Kbyte, 4 Kbytes, 7 Kbytes or 23 Kbytes in size.

It is known that the fact of filling a residual memory space by a fixed data item can help an attacker of the microcontroller to analyze the structure of the ROM memory, and this may contribute to imperiling the security of the chip card.

This is why, according to the state of the art, to secure such a memory, each byte of the residual memory space is filled by generally random data. As these random data are coded on one byte, numbers lying between 0 and 255 are involved.

However, it has been observed that this procedure has significant drawbacks in terms of security and reliability.

Specifically, in the event of a fault attack, or more generally in the event of an execution error following a disturbance, the running of the execution of a program may be disturbed in such a manner that subsequent to the disturbance, the microcontroller is induced to read at an unforeseeable location arbitrary data in the ROM memory and to execute these data.

This originates from the fact that the data coded on one byte that are used to fill the residual memory spaces of the ROM memory, may correspond to instructions. Specifically, an instruction is, in general, associated with a data item (or corresponds thereto). For example, according to the 8051 assembler, the data item 0x36 corresponds to the jump instruction "jmp".

Following the disturbance of a program, when execution is induced to continue within a memory space corresponding to a residual memory space filled by random data, the first data item read is considered by the microcontroller to be an instruction. Therefore, if the random data item has the value 0x36, then the microcontroller interprets this data item as being the "jmp" instruction; this instruction normally being followed by the jump address, the following bytes (in general also originating from the random filling) are read and interpreted as being the relative or absolute address of the jump. Specifically, after reading a data item interpreted by the microcontroller as being an instruction, the former automatically determines, as a function of the instruction "read", the number of operands of the instruction and therefore the number of bytes to be read so as to obtain its operands.

The execution of this filling data item interpreted as a jump instruction can lead to jumping in a memory space corresponding to a random-data filling area, but might also lead to jumping in the memory to an address that could correspond to a program or to data that are sensitive in respect of the security of the chip card.

Thus this procedure for filling residual memory spaces by random data has the following drawback. Following a disturbance, the processor may be induced to read arbitrary data from the memory, in particular random data from a residual memory space, to execute them as if this involved the execution run and to return in an unauthorized way to a sensitive area of the application or memory and therefore imperil the security of the chip card.

SUMMARY OF THE INVENTION

The present invention is aimed at a procedure for security filling a memory that does not exhibit the above drawbacks.

For this purpose, it proposes a method for security filling at least one residual memory space of a memory comprising, in practice, at least one program. This method is applicable in particular in a chip card. According to this method, successive cycles are performed according to which at least one data item is chosen from among a predetermined set of authorized data, the set of authorized data excluding at least one data item corresponding to a determined instruction, and said at least one chosen data item is inserted into said at least one residual memory space so as to fill at least one part of this residual memory space.

The method according to the invention therefore makes it possible to fill residual memory spaces of a memory on the basis of data belonging to a predetermined set of authorized data, this set excluding at least one data item corresponding to a determined instruction. Specifically, the data generally correspond to instructions and one may wish to exclude some of them from any residual memory space.

This set of authorized data excludes in practice at least one data item whose corresponding instruction may imperil the security of the system should this data item come to be executed. As the data inserted into residual memory spaces are at risk of being executed following a disturbance, in practice of the fault attack type, the risk of imperiling the security of the card is thus minimized.

This embodiment also makes it possible to resist attacks consisting in detecting and analyzing the structure of the memory when the choice of the filling data item varies from one cycle to another.

According to a preferred characteristic, the data of the set of authorized data correspond to instructions having no dangerous effect on the running of said at least one program. Stated otherwise, the presence of these data does not imperil the security of the card if these data are induced, following a disturbance, to be executed.

According to another preferred characteristic, said at least one excluded data item corresponds to at least one instruction of jump instruction type since the execution of such an instruction would run the risk of resulting in the continuation of this execution in the program or in a sensitive area.

According to yet another advantageous characteristic, said at least one excluded data item corresponds to at least one instruction of execution stack use instruction type, in particular an instruction to modify the execution stack.

According to yet another preferred characteristic, at least one excluded data item corresponds to at least one operand of configuration registers type.

According to a particularly advantageous embodiment, for each elementary memory space of the residual memory space, a data item in the set of authorized data whose corresponding instruction and whose operands are coded on at most n elementary memory spaces is determined, n being the size of the residual memory space remaining to be filled; the data item determined is inserted into the elementary memory space considered of the residual memory space; and the new size n of the residual memory space remaining to be filled is determined.

According to this embodiment, an elementary data item is determined and inserted at one and the same time, independently of the following data which could be interpreted as operands of the instruction corresponding to this elementary data item.

The insertion of the data item can be carried out at the start of the residual memory space, thereby corresponding to sequential filling. As a variant, the filling can be a filling in a random order or in reverse, in particular.

The determination of the new size of the residual memory space is, in particular, carried out by decreasing the size of the residual memory space by the size of the data item inserted into the residual memory space undergoing filling, that is to say by a single unit since here the data item is elementary.

This filling method thus makes it possible to fill a residual memory space in such a manner that the data following the residual memory space and belonging to a program are not at risk of being considered to be operands of an instruction associated with a filling data item when the filling data are executed following a disturbance. Specifically, the filling is carried out in such a manner that when a data item is executed as an instruction, its operands are contained in the residual memory space. The program or the data following the residual memory space will thus not be considered to be operands.

According to an advantageous complementary characteristic, the method furthermore comprises the insertion of an instruction for ejection to an action program and of the address of the action program.

According to this preferred characteristic, the residual memory space is filled so that it contains an instruction for ejection to an action program with a view to processing the anomaly that led to the residual memory space. Thus the program and the data following the residual memory space will not be executed, whereas the anomaly will be processed.

According to another additional preferred characteristic, the insertion of this ejection instruction is carried out at the end of the residual memory space.

According to yet another additional preferred characteristic, the address of the action program is represented by data of the set of authorized data.

According to this characteristic, if the data coding the address of the action program are executed as instructions, then the security of the chip card is not imperiled.

According to another advantageous characteristic, the method comprises, as a complement or otherwise to an ejection instruction, the insertion of an action program; in this case, the residual memory space also comprises the program that processes the anomaly.

According to another additional advantageous characteristic, the insertion of the action program is carried out at the end of the residual memory space.

According to yet another preferred characteristic, the action program comprises countermeasure instructions.

According to yet another preferred characteristic, the choosing of said at least one data item from among the set of authorized data is done randomly. As a variant, it can, for example, be done cyclically.

According to yet another preferred characteristic, the memory is a permanent memory of ROM memory type.

The invention also proposes a secure method of executing programs, in particular in a chip card, according to which a method for security filling at least one residual memory space of a memory, of the aforesaid type according to the invention, is implemented prior to the execution of said programs.

Correlatively, the invention proposes a device for security filling at least one residual memory space of a memory comprising at least one program, in particular in a chip card; this device comprises a storage area containing a predetermined set of authorized data, said set of authorized data excluding at least one data item corresponding to a determined instruction; means for choosing at least one data item from among the predetermined set of authorized data; and means for inserting said at least one chosen data item into said at least one residual memory space so as to fill at least one part of said at least one residual memory space, and means for cyclically controlling the choosing means and the inserting means.

This device has the same advantages as the method for security filling at least one residual memory space of a memory.

The invention also proposes a memory comprising at least one program and at least one residual memory space filled by the method for filling at least one residual memory space according to the invention.

In particular, the invention also proposes a memory comprising at least one program and at least one residual memory space filled by data chosen from a set of authorized data excluding at least one data item corresponding to a determined instruction.

BRIEF DESCRIPTION OF THE DRAWINGS

Other aspects and advantages of the present invention are more clearly apparent on reading the description of particular embodiments which follows, this description being given only by way of nonlimiting illustrative example, with regard to the appended drawings in which:

FIG. 3 is an example of the result of filling a residual memory space according to the algorithm of FIG. 2;

DETAILED DESCRIPTION OF THE INVENTION

Figure 1:
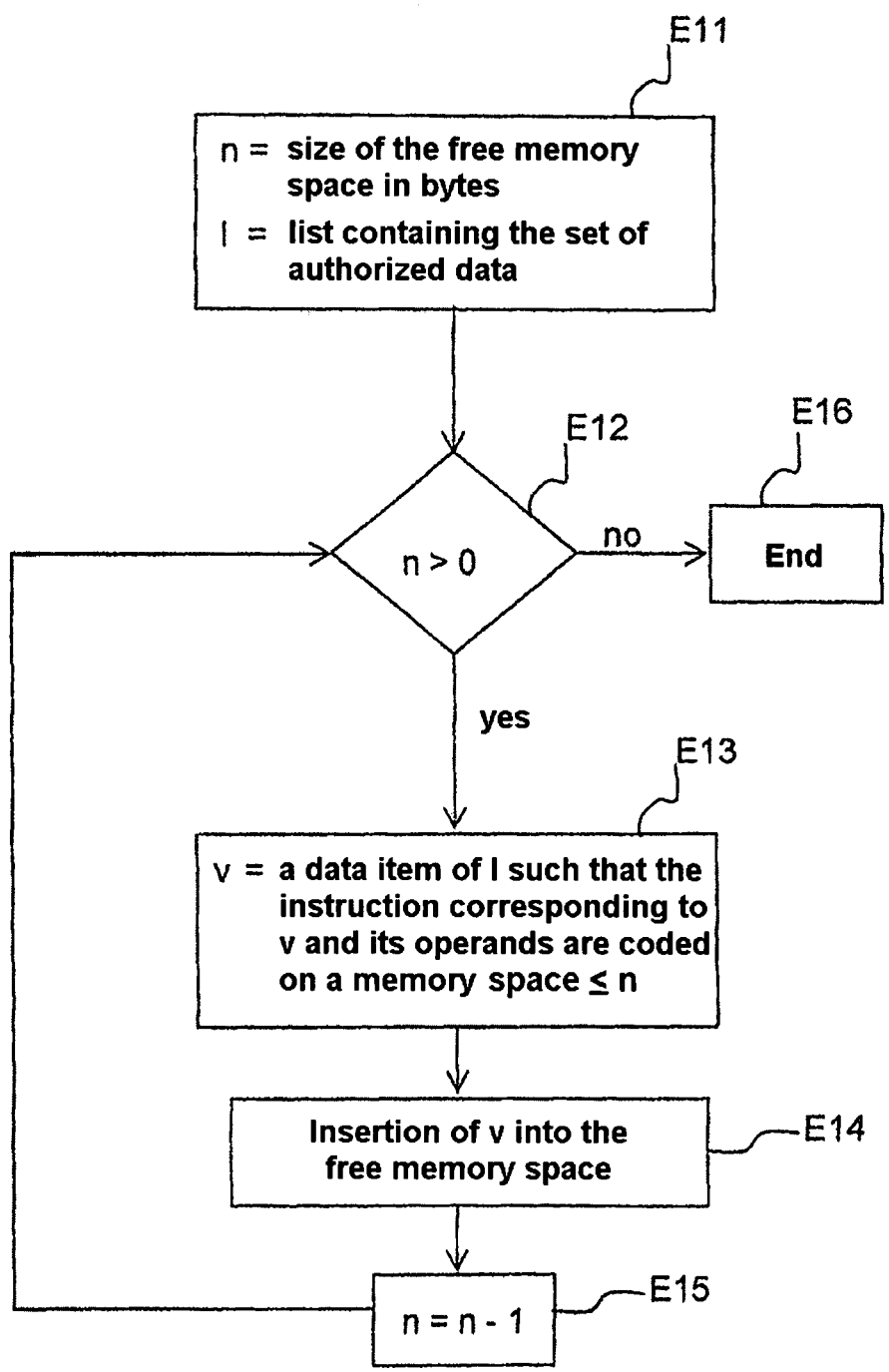
FIG. 1 is an algorithm for filling a residual memory space.

As is known, a program stored within a memory is composed of instructions and operands. With each instruction (in assembler language) is associated a data item whose size is at least one elementary memory space, for example, one byte. These instructions can have zero, one, two or indeed more operands. These operands are generally stored after the instruction. It is assumed, hereinafter, by way of example, that each instruction is coded on one byte and that the operands are coded on one or two or indeed more bytes. But the invention is readily generalized to cases where the data occupy more than one byte.

Upon execution, the microcontroller analyzes the first byte so as to determine the instruction to be executed and deduce the number of operands associated with this instruction, then reads these operands. Thus, the execution of an instruction requires the reading of one or more bytes in a given order.

An inserted program is therefore composed of a set of instructions and operands coded respectively on a succession of bytes.

In a likewise known manner, the programs and possibly the associated data are inserted into a memory according to ordering rules such that one or more unoccupied memory space(s) are left.

This memory can be a permanent memory, for example, a ROM, EEPROM, FLASH memory or a hard disk, or a volatile memory, for example of RAM type.

With a view to securing a memory, in particular a ROM memory, by filling, the unoccupied memory spaces (also called residual memory spaces) of the memory are filled by data which, in normal circumstances, are never read.

However, as seen above, among the set of data that it is possible to code on an elementary memory space, there is in practice a certain number of data which are not inoffensive, that is to say they correspond to instructions whose execution, following an attack, may be dangerous to the security and reliability of the card. By way of example, the data corresponding to jump instructions may bring to fruition the disturbed execution in progress in an area of the memory of the card containing sensitive data.

According to the invention, the set of possible data that it is acceptable to code on an elementary memory space, for example a byte, are sorted beforehand. Thus, on the one hand, the data corresponding to instructions which may be dangerous to the security of the card and, on the other hand, the data corresponding to instructions having no dangerous effect on the behavior of the programs in the chip card and which therefore do not introduce a risk as regards the security of the chip card should they come to be executed by accident, are determined.

On completion of this operation, a set of data that are unauthorized since they are dangerous to the security of the chip card during their execution and a set of authorized data are therefore obtained.

The filling of the residual memory spaces is carried out by choosing, for example randomly, only values forming part of the set of authorized data, therefore excluding the unauthorized data.

Alternatively, the values can in particular be taken sequentially in the set of authorized data, in any predefined order.

The instructions that are dangerous to the security of the chip card comprise in particular the jump instructions such as, for example, in the 8051 assembler language, the instructions of type "jnz" (which can be translated by "jump if the result of the previous instruction (result present at the top of the execution stack) is not equal to 0"), "jz" (that can be translated by "jump if the result of the previous instruction (result present at the top of the execution stack) is equal to 0"), "jmp" (which can be translated by "jump").

Specifically, these instructions might, in the event of unscheduled execution, reach a part of the program which could imperil the security of the system.

Thus, according to a preferred embodiment, the data corresponding to these instructions are identified as belonging to the set of unauthorized data and not to the set of authorized data.

Furthermore, the unauthorized instructions can comprise the instructions manipulating the execution stack. The execution stack serves, in particular, to place the return address during a function call, save the execution context when an interrupt has to be processed, place the local variables, pass the arguments to a function.

According to the language used, the instructions that manipulate the execution stack are the function call ("call" instruction), the return instruction when ending the execution of a function ("ret" instruction), the instructions that put values into or remove a value from the stack ("push" and "pop" instructions).

The data corresponding to these instructions are in particular put into the set of unauthorized data, and therefore are advantageously not present in the set of authorized data.

Moreover, the set of authorized data advantageously does not comprise the data corresponding to operands that could be dangerous to the security and reliability of the chip card.

Specifically, very often, the instructions are not dangerous as they stand, but they become so when they are manipulated with operands termed dangerous.

For example, the function call instruction ("call") is very much an instruction that is dangerous to the security of the chip card, when the operand containing the address of the function points to a program or subroutine that is dangerous to the security of the chip card, that is to say points to a program which must only be executed in a scheduled manner, that is to say at the right time.

Moreover, the set of authorized data advantageously does not comprise the set of operands corresponding to the configuration registers. These configuration registers are also called SFRs (in English terminology "Special Function Registers"). They are, for example, clock configuration registers, or UART (in English terminology "Universal Asynchronous Receiver/Transmitter") configuration registers.

In this way, the set of authorized data not comprising the data corresponding to the configuration registers, the use of dangerous operands associated with instructions that are not dangerous per se is prohibited.

The same holds as regards, for example, the addition instruction ("add" instruction) and incrementation instruction ("inc" instruction): they are not dangerous when they are executed with nondangerous operands but may become so when they are executed with, in particular, operands that manipulate a configuration register.

Thus, as previously mentioned, prior to the filling of one or more residual memory spaces of a memory, the set of authorized data to be used during the filling of the residual memory spaces is determined.

According to a variant, it is possible to begin by determining three data sets. The first set comprises the authorized data, that is to say that does not in any way imperil the security of the chip card (such as described above); this set is called the set of authorized data. A second set comprises the unauthorized data, that is to say the data identified as dangerous (such as described above); this set is called the set of unauthorized data. It is, in fact, data corresponding to instructions or to operands that are dangerous to the security and reliability of the chip card. Finally, a third set comprises the data whose correspondence is not defined in the specification of the microcontroller component of the chip card and which may or may not, depending on the case, be dangerous.

The third set corresponding to the data that are not defined in the specification of the component can thereafter be distributed between the first and second sets according to the specification of the component. In particular, if the use of the data of the third set triggers a security action on the component, then this set can be associated with the set of authorized data.

A first embodiment of the filling of a residual memory space is now described. This implementation is based on a microcontroller whose data which correspond to instructions are coded on one byte and whose operands are coded on one or two bytes.

With reference to FIG. 1, an algorithm for filling a residual memory space whose size is n bytes is presented.

The algorithm starts in step E11 by initializing the variable n and the list 1, the variable n being initialized to the size of the residual memory space and represents the size of the residual memory space remaining to be filled, and the list 1 containing the set of authorized data.

Step E11 is followed by step E12 in which a test is performed to verify whether the size of the residual memory space remaining to be filled is greater than zero, that is to say whether a residual memory space remains to be filled.

If not, the algorithm is ended through step E16.

In the converse case, that is to say the residual memory space has not been completely filled, step E12 is followed by step E13.

In step E13, a data item v whose corresponding instruction (were it to be executed by a microcontroller) would be coded with its operands on at most n bytes, is taken from the set of authorized data, for example randomly.

According to a variant, one takes the first data item of the list 1 such that the corresponding instruction and its operands are coded on at most n bytes.

Thereafter, step E14 consists in inserting the data item v into the residual memory space, preferably at the first free place.

Step E14 is followed by step E15 which consists in decrementing the size of the residual memory space remaining to be filled n by the size of the data item v. Specifically, the size of the residual memory space remaining to be filled is decreased by inserting this data item. Here this decrease is one unit since here the data are coded on a single byte.

Step E15 is followed by a return to step E12, described previously.

Steps E12 to E15 are thus iterated so as to fill the residual memory space.

According to a variant embodiment, the insertion of the data item v in step E14 is carried out in a randomly defined memory location in the residual memory space.

If this location has already been filled, then the insertion is carried out, for example, at the first next free location.

Figure 2:
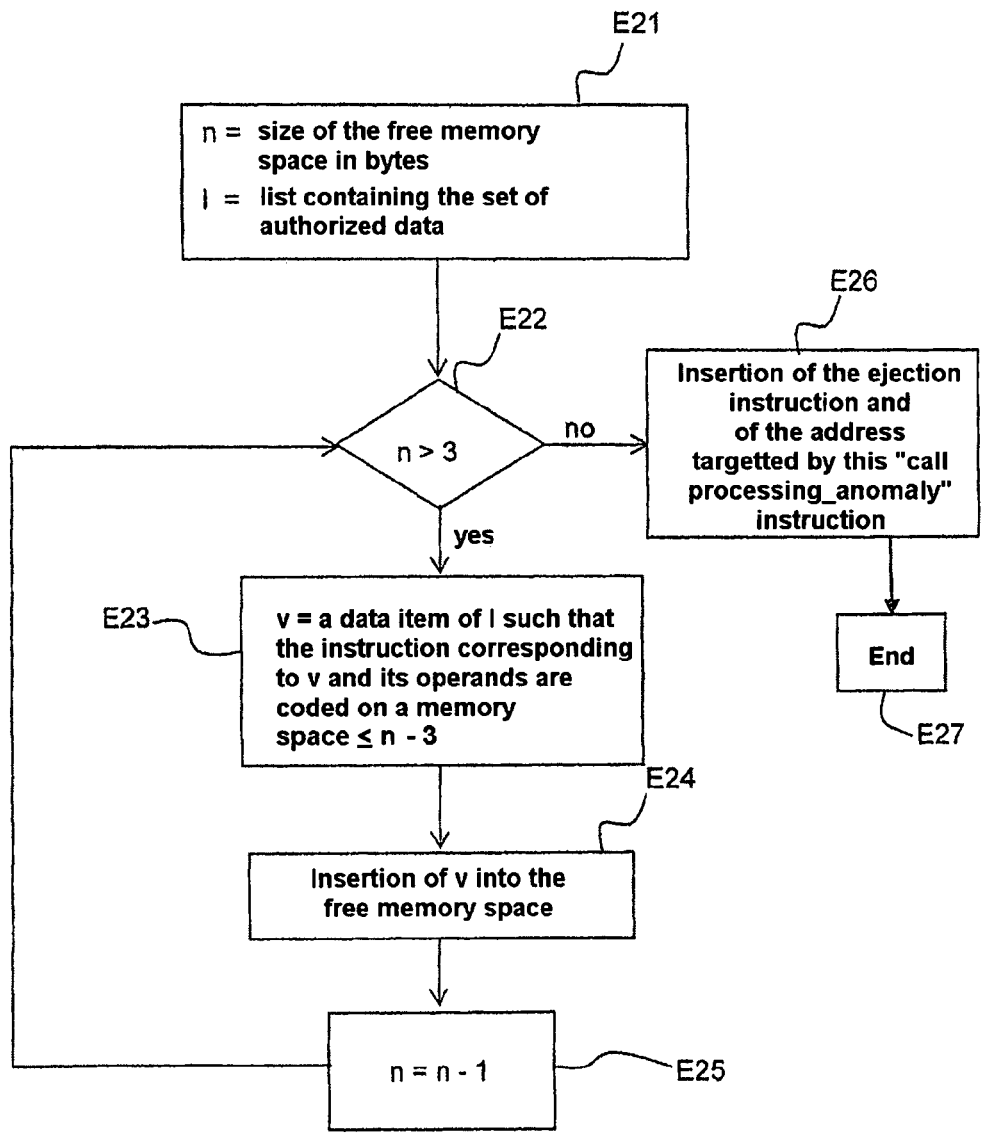
FIG. 2 is a variant of the algorithm for filling such a residual memory space of FIG. 1.

FIG. 2 illustrates a variant embodiment of the algorithm of FIG. 1 according to which the filling of the residual memory space terminates with the insertion of an instruction for ejection to an action program with a view to processing the anomaly. This ejection instruction therefore allows the execution of the action program.

If the ejection instruction is coded on one byte and the absolute address of the action program on two bytes, then, the filling algorithm executes in a manner similar to the algorithm of FIG. 1 on the residual memory space of size n−3 bytes and then inserts the ejection instruction and the address of the action program on the last three bytes of the residual memory space. As a variant, this insertion can be done first.

Specifically, according to this variant, the filling of the residual memory space is carried out according to the algorithm of FIG. 1 so long as the residual memory space remaining to be filled is greater than a given threshold which, in the example considered here, is the aggregate size of the ejection instruction and of the coding of the address of the action program.

According to another variant, the threshold can be greater than the aggregate size of the ejection instruction and of the coding of the address of the action program.

Thus, the algorithm according to this variant is the following.

The filling algorithm of FIG. 2 starts in step E21 similar to step E11 of FIG. 1 in the course of which a variable n is initialized to the value of the size of the residual memory space and represents the size of the residual memory space remaining to be filled and a list 1 is initialized to the set of authorized data.

Step E21 is followed by step E22 in which a test is performed to verify whether the residual memory space remaining to be filled is of greater size than the given threshold, that is to say than three bytes according to the example, three bytes being the aggregate size of the ejection instruction and of the address of the action program.

If it is, step E22 is followed by step E23.

In the converse case, that is to say when the size of the residual memory space remaining to be filled is less than or equal to the given threshold, that is to say three bytes, step E22 is followed by step E26 described hereinafter.

In the course of step E23, a data item v is taken, in particular randomly, from the set 1 of the authorized data whose corresponding instruction, were it to be executed by the appropriate microcontroller, would be coded with and its operands on at most n−3 bytes.

According to a variant, the first data item of the list 1 is taken such that the corresponding instruction and its operands are coded on at most n−3 bytes.

Step E23 is thereafter followed by step E24 consisting in inserting the data item v into the residual memory space, preferably, at the first free place.

Step E24 is followed by step E25 which consists in decrementing the value n of the size of the residual memory space remaining to be filled by the size of the data item v. Specifically, the size of the residual memory space remaining to be filled is decreased by inserting this data item.

Steps E22 to E25 are then iterated so long as the size of the residual memory space remaining to be filled is greater than three bytes.

When, in step E22, the test is negative, that is to say the size of the residual memory space remaining to be filled is less than or equal to the given threshold, that is to say three bytes, then step E22 is followed by step E26.

Step E26 consists in inserting into the residual memory space remaining to be filled an instruction for ejection to an action program and the address of the action program, this ejection instruction therefore allowing the execution of the action program.

The ejection instruction is, for example, an instruction of jump instruction type, for example the "jmp" instruction or the "ljmp" instruction, or an instruction of subroutine call instruction type which has as argument the address of the action program, for example, the "call" instruction.

The ejection instruction is followed by two bytes indicating the address of the action program.

The residual memory space having been filled, the algorithm thereafter terminates in step E27.

According to this algorithm, the residual memory space is filled until the size of the residual memory space remaining to be filled is equal to three bytes.

Thus, this memory space is filled so as to leave the last three bytes of the residual memory space for a predefined insertion. Stated otherwise, the filling is begun by simulating the absence of the last three bytes of the residual memory space, before filling them in a predefined way.

This embodiment makes it possible to prevent the bytes of the ejection instruction and the address of the ejection instruction from being considered to be operands of previous instructions if the latter are executed following a disturbance.

Moreover, one also ensures that, in the event of a disturbance leading into the residual memory space considered, the ejection instruction is executed and therefore that the action program is actually executed.

Thus, in the event of a disturbance, when the execution of the program finishes within the memory space that is not occupied by the programs and data of the card, the execution of the instructions of this memory space is diverted to an action program.

In order to increase the security of the chip card, the address of the ejection instruction is advantageously formed of one or more data items chosen from among the set of authorized data. If the address is coded on two bytes, then each of these bytes corresponds to a data item of the set of authorized data.

In a preferred embodiment, the data of the address are chosen from the set of data that are not defined in the specification of the microcontroller component of the chip card if the use of these data triggers a security action on the component.

For this purpose, during compilation, the address in the memory where the action program must be positioned is indicated as compilation parameters.

In an advantageous manner, the action program is composed of at least one instruction aimed at executing a countermeasure or more generally a security batch.

For example, this may involve a card destruction program, the execution of an infinite loop or the reinitialization of the program.

According to a particular variant embodiment, the insertion of the data item v in step E24 is carried out in a randomly defined memory location in the residual memory space.

If this location has already been filled, then the insertion is carried out, for example, at the first next free location.

According to another variant, step E26 consisting in inserting the instruction for ejection to an action program and the address of the action program can be carried out at the start of the algorithm.

FIG. 3 illustrates an exemplary result of the filling of a residual memory space 8 bytes in size, carried out according to the variant embodiment of the filling of FIG. 2.

Thus the last three bytes have been reserved with a view to containing the ejection instruction and the address of the action program, i.e. the "call processing_anomaly" instruction.

This space can be analyzed a posteriori as follows.

The first byte has been filled with the data item "0x65" corresponding to the addition instruction "add" belonging to the list of authorized instructions. This instruction has been coded, according to the example, on a single byte, therefore on a size of less than n−3 bytes (8−3=5 bytes).

The data item inserted at the second location is a data item corresponding to an instruction which is normally coded, with its operands, on at most the size of the residual memory space to be filled minus 3 bytes, i.e. 4 bytes. Specifically, the chosen data item is 0xD2, corresponding to the "mov" instruction. This instruction and its operands are normally coded on 3 bytes, i.e. a size of less than 4 bytes.

The next data item is a data item whose corresponding instruction and whose operands are coded on at most 3 bytes (the size of the residual memory space remaining to be filled being here 6 bytes minus 3 bytes for the insertion of the ejection instruction). Here the data item chosen is 0x56 corresponding to the "inc" instruction. But this instruction requires a single byte for its execution.

The next data item is a data item whose corresponding instruction and whose operands are coded on at most 2 bytes. Specifically, the size of the residual space remaining to be filled is 5 bytes minus 3 bytes for the insertion of the ejection instruction. The chosen data item is 0x89 corresponding to the "add" instruction. This instruction requires a single byte for its execution.

Finally, the next data item is a data item whose corresponding instruction and whose operands are coded on at most one byte. Specifically, the size of the residual space remaining to be filled is 4 bytes minus 3 bytes for the insertion of the ejection instruction. The chosen data item is 0x56 corresponding to the "inc" instruction. This instruction requires a single byte for its execution.

The residual memory space remaining to be filled is 3 bytes in size. This is where the ejection instruction is inserted. The ejection instruction "call processing_anomaly" is coded in the following manner. The data item 0x16 corresponds to the "call" instruction, that is to say to the function call, and the data 0x65 0x56 represent the address of the action program called "processing_anomaly". The bytes of the address of the action program "processing_anomaly" correspond to data (0x65 and 0x56) belonging to the set of authorized data.

Figure 4:
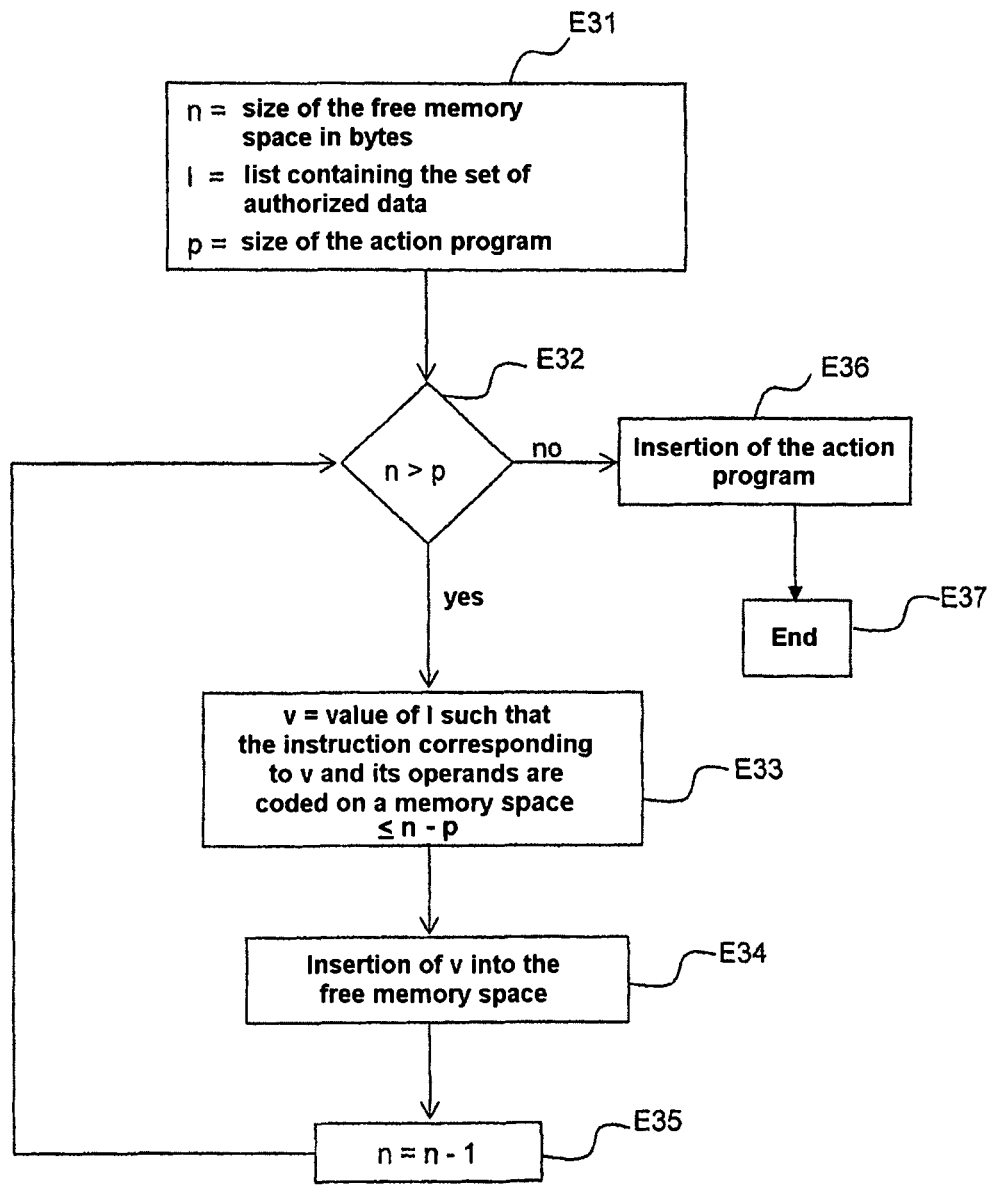
FIG. 4 is another variant of the algorithm for filling a residual memory space of FIG. 1.

FIG. 4 illustrates a second variant embodiment of the filling of a residual memory space of size n bytes, according to which the residual memory space is filled so as to contain the body of the action program, here at the end of the residual memory space.

Thus, according to this variant embodiment, the algorithm of FIG. 1 is applied to the residual memory space decreased by the size of the action program.

Specifically, the filling is carried out so long as the residual memory space remaining to be filled is greater than a given threshold, this threshold being here, the size of the action program.

According to another variant, the threshold can be greater than the size of the action program.

The algorithm according to this variant is the following.

The algorithm starts in step E31 similar to step E11 of FIG. 1.

This step initializes the variable n to the size of the residual memory space and represents the size of the residual memory space remaining to be filled, the list 1 with the set of authorized data and the variable p to the size of the action program.

Step E31 is followed by step E32 in which a test is performed to verify whether the size of the residual memory space remaining to be filled is greater than the given threshold, that is to say than the size of the action program p.

If it is not, the algorithm continues in step E36 described hereinafter.

In the converse case, that is to say when the size of the residual memory space remaining to be filled is of greater size than the given threshold, that is to say than the size of the action program, step E32 is followed by step E33.

Step E33 randomly takes a data item v from the set of data whose corresponding instruction, if it were executed by the appropriate microcontroller, and its operands are coded on at most n-p bytes, that is to say the size of the residual memory space remaining to be filled decreased by the size of the action program.

Step E33 is followed by step E34 consisting in inserting the data item v into the residual memory space respectively at the first free place.

Step E34 is thereafter followed by step E35 which consists in decrementing the size of the residual memory space remaining to be filled n by one unit. Specifically, the size of the residual memory space remaining to be filled is decreased by the insertion of this data item, whose size is one byte.

Step E35 is followed by step E32 described previously.

Steps E32 to E35 are thus iterated until the residual memory space of size n-p is filled.

In step E32, when the size of the residual memory space is equal to the given threshold, that is to say to the size of the action program in this example, then step E32 is followed by step E36 consisting in inserting the action program into the residual memory space remaining to be filled. Thereafter, the algorithm is ended in step E37.

According to a particular embodiment, the insertion of the data item v in step E24 is carried out in a randomly defined memory location in the residual memory space.

If this location has already been filled, then the insertion is carried out, for example, at the first next free location.

According to another variant, step E36 consisting in inserting the action program can be carried out at the start of the algorithm.

According to other embodiment variants, the residual memory spaces can be filled by data corresponding to instructions, such that the instruction and its operands are coded on a single elementary memory space. These data can be chosen for example, randomly or sequentially from the list of authorized data.

It should be noted that the programs and the associated data are inserted into a memory according to ordering rules and a residual memory space is very often left at the end of this memory, this memory being either a permanent memory, for example, a ROM, EEPROM, FLASH memory or a hard disk, or a volatile memory, for example of RAM type.

Thus, the embodiments of the filling method are particularly suited to the filling of the residual memory space present at the end of the memory.

Figure 5:
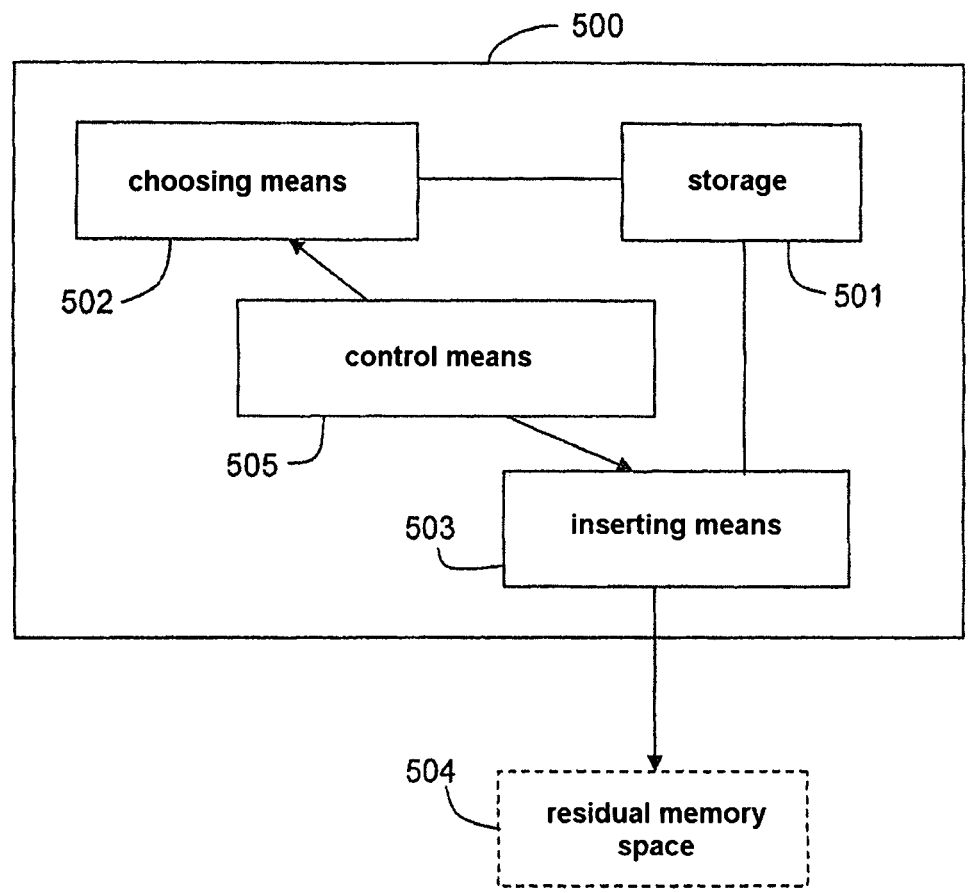
FIG. 5 is a device which possesses the whole set of means necessary for implementing the method of the invention for security filling at least one residual memory space of a memory.

FIG. 5 represents a device which possesses the whole set of means necessary for implementing the method of the invention for security filling at least one residual memory space of a memory.

This device is, for example, installed in a micro-computer and is intended for filling a residual memory space of a memory, in particular of a memory contained in a chip card.

According to the chosen embodiment, this device can be, for example, a micro-computer 500, comprising a storage area containing the predetermined set of the authorized data 501; with each of the data therein is associated a coding size cue. This size indicates the number of elementary memory spaces over which the instruction corresponding to the data item and its operands are coded if this data item is executed by a microcontroller.

The micro-computer also comprises choosing means 502 which are able to choose at least one data item from among the stored set of authorized data.

According to a variant, the choosing means 502 are able to determine a data item in the set of authorized data whose corresponding instruction and whose operands are coded on at most n elementary memory spaces, n being the size of the residual memory space remaining to be filled.

For this purpose, the size cue associated with a data item is used.

The micro-computer also comprises inserting means 503 for inserting the chosen data item so as to fill at least one part of the residual memory space 504 of a memory which has been previously linked, for example temporarily, to the device 500.

Moreover, the device 500 comprises means 505 for cyclically controlling the choosing means 501 and the inserting means 502.

Of course, the present invention is in no way limited to the embodiments described and represented; it is for example also applicable to the security filling of at least one residual memory space of a memory comprising at least one program written in Java Card and compiled as bytecode interpretable by a Java Card virtual machine.

The invention claimed is:

1. Method for security filling at least one residual memory space of a read-only memory comprising at least one program, the method comprising:
    before detecting a fault attack on the read-only memory, repeating in successive cycles the steps of,
    choosing at least one data item from among a predetermined set of authorized data, said set of authorized data excluding at least one data item corresponding to a determined instruction; and
    after the choosing step, inserting said at least one chosen data item into said at least one residual memory space of the read-only memory so as to fill at least one part of this residual memory space, wherein the at least one program remains normally operable in the read-only memory after the choosing and inserting steps.

2. Method according to claim 1, in which the data of the set of authorized data correspond to instructions having no dangerous effect on the running of said at least one program.

3. Method according to claim 1, in which said at least one excluded data item corresponds to at least one instruction of jump instruction type.

4. Method according to claim 1, in which said at least one excluded data item corresponds to at least one instruction of execution stack use instruction type.

5. Method according to claim 1, in which said at least one excluded data item corresponds to at least one operand of configuration registers type.

6. Method according to claim 1, in which, for each elementary memory space of the residual memory space:
   a data item in the set of authorized data whose corresponding instruction and whose operands are coded on at most n elementary memory spaces is determined, n being the size of the residual memory space remaining to be filled;
   the data item determined is inserted into the elementary memory space considered of the residual memory space;
   the new size n of the residual memory space remaining to be filled is determined.

7. Method according to claim 1, furthermore comprising the insertion of an instruction for ejection to an action program and of the address of the action program.

8. Method according to claim 7, in which the insertion of an ejection instruction is carried out at the end of the residual memory space.

9. Method according to claim 8, in which the address of the action program is represented by data of the set of authorized data.

10. Method according to claim 1, furthermore comprising the insertion of an action program.

11. Method according to claim 10, in which the insertion of the action program is carried out at the end of the residual memory space.

12. Method according to claim 7, in which the action program comprises countermeasure instructions.

13. Method according to claim 1, according to which the choosing of said at least one data item from among the set of authorized data is done randomly.

14. Secure method of executing programs, wherein prior to the execution of said programs, a method for security filling at least one residual memory space of a read-only memory is implemented in accordance with claim 1.

15. Device for security filling, prior to detection of a fault attack, at least one residual memory space of a read-only memory comprising at least one program, the device comprising:
   a storage area (501) containing a predetermined set of authorized data, said set of authorized data excluding at least one data item corresponding to a determined instruction,
   means (502) for choosing at least one data item from among the set of authorized data,
   means (503) for inserting said at least one chosen data item into said at least one residual memory space of the read-only memory so as to fill at least one part of said at least one residual memory space before detection of a fault attack on the read-only memory,
   means (505) for cyclically controlling the choosing means and the inserting means, while allowing said at least one program to remain normally operable in the read-only memory following the choosing and inserting.

16. Device according to claim 15, in which the data of the set of authorized data correspond to instructions having no dangerous effect on the running of said at least one program.

17. Device according to claim 15, in which, with each data item of the predetermined set of authorized data is associated a cue of size of the instruction corresponding to the data item with its operands.

18. Device according to claim 15, in which said at least one excluded data item corresponds to at least one instruction of jump instruction type.

19. Device according to claim 15, in which said at least one excluded data item corresponds to at least one instruction of execution stack use instruction type.

20. Device according to claim 15, in which said at least one excluded data item corresponds to at least one operand of configuration registers type.

21. Device according to claim 15, in which for each elementary memory space of the residual memory space:
   the choosing means are able to determine a data item in the set of authorized data whose corresponding instruction and whose operands are coded on at most n elementary memory spaces, n being the size of the residual memory space remaining to be filled;
   the inserting means are able to insert the data item determined into the elementary memory space considered of the residual memory space;
   the control means are able to determine the new size n of the residual memory space remaining to be filled.

22. Device according to claim 15, in which the inserting means are able, furthermore, to insert an instruction for ejection to an action program and the address of the action program.

23. Device according to claim 22, in which the means for inserting an ejection instruction are able to insert the ejection instruction at the end of the residual memory space.

24. Device according to claim 22, in which the address of the action program is represented by data of the set of authorized data.

25. Device according to claim 15, in which the inserting means are, furthermore, able to insert an action program.

26. Device according to claim 25, in which the inserting means are able to insert the action program at the end of the residual memory space.

27. Device according to claim 22, in which the action program comprises countermeasure instructions.

28. Device according to claim 19, according to which the means for choosing at least one data item from among the set of authorized data are able to choose said at least one data item randomly.

* * * * *